(12) United States Patent
Dunn et al.

(10) Patent No.: US 7,702,031 B2
(45) Date of Patent: Apr. 20, 2010

(54) SYSTEM AND METHOD FOR ADAPTIVE MODULATION

(75) Inventors: J. Eric Dunn, St. Paul, MN (US); Mervin L. Grindahl, Waseca, MN (US); Keith Barnes, Waseca, MN (US)

(73) Assignee: NextNet Wireless, Inc., Bloomington, MN (US)

( * ) Notice: Subject to any disclaimer, the term of this patent is extended or adjusted under 35 U.S.C. 154(b) by 1168 days.

(21) Appl. No.: 11/073,006

(22) Filed: Mar. 4, 2005

(65) Prior Publication Data

US 2005/0195908 A1   Sep. 8, 2005

Related U.S. Application Data

(60) Provisional application No. 60/550,517, filed on Mar. 5, 2004.

(51) Int. Cl.
  *H04L 27/00* (2006.01)
  *H04L 23/00* (2006.01)

(52) U.S. Cl. ................. 375/295; 375/377

(58) Field of Classification Search ............ 375/136, 375/147, 296, 344, 358, 222, 259, 260–261, 375/279–281, 295, 298, 308; 455/23, 42, 455/44, 205; 379/93.01, 343, 408; 370/74, 370/98, 208, 210, 491, 500, 509–510, 522, 370/525–529
See application file for complete search history.

(56) References Cited

U.S. PATENT DOCUMENTS

| | | | |
|---|---|---|---|
| 5,282,204 A | 1/1994 | Shpancer et al. | |
| 5,548,805 A | 8/1996 | Shpantzer et al. | |
| 5,600,672 A | 2/1997 | Oshima et al. | |
| 5,809,083 A * | 9/1998 | Wright | 375/285 |
| 6,128,276 A | 10/2000 | Agee | |
| 6,359,923 B1 | 3/2002 | Agee et al. | |
| 6,496,490 B1 | 12/2002 | Andrews et al. | |
| 6,496,535 B2 | 12/2002 | Xu | |
| 6,512,737 B1 | 1/2003 | Agee | |
| 6,700,866 B1 | 3/2004 | Heinonen et al. | |
| 6,701,129 B1 | 3/2004 | Hashem et al. | |

(Continued)

FOREIGN PATENT DOCUMENTS

WO   0103397 A1   1/2001

(Continued)

OTHER PUBLICATIONS

Otsuki et al., Performance of Modulation-Level Controlled Adaptive Modulation Systems, Electronics & Communications in Japan—Part 1, Jul. 7, 1996, pp. 81-93, vol. 79, No. 7.

(Continued)

*Primary Examiner*—Tesfaldet Bocure
*Assistant Examiner*—Lawrence B Williams (57) ABSTRACT

A wireless communication system is configured for adaptive modulation of a transmitted symbol. The specific modulation and/or coding is uniquely identified and data related thereto is embedded within the transmitted symbol. A receiver extracts pilot signals form the transmitted symbol and performs a correlation analysis to identify the particular modulation/coding used for that particular transmitted symbol. This permits adaptive modulation on a symbol-by-symbol basis. A base station communicating with a plurality of peripheral subscribers may utilize different modulation/coding for each subscriber depending on channel conditions.

39 Claims, 3 Drawing Sheets

U.S. PATENT DOCUMENTS

| | | | |
|---|---|---|---|
| 6,717,934 B1* | 4/2004 | Kaasila et al. | 370/347 |
| 6,769,093 B1* | 7/2004 | Krieger | 714/814 |
| 6,774,829 B2* | 8/2004 | Nakada et al. | 341/126 |
| 6,882,618 B1* | 4/2005 | Sakoda et al. | 370/208 |
| 7,095,996 B2* | 8/2006 | Tamaki et al. | 455/296 |
| 2001/0017896 A1* | 8/2001 | Murakami et al. | 375/260 |
| 2001/0024427 A1 | 9/2001 | Suzuki | |
| 2002/0034267 A1 | 3/2002 | Chuang et al. | |
| 2002/0042836 A1 | 4/2002 | Mallory | |
| 2002/0054632 A1 | 5/2002 | Chuang et al. | |
| 2002/0060990 A1 | 5/2002 | Bohnke et al. | |
| 2002/0080886 A1 | 6/2002 | Ptasinski et al. | |
| 2002/0102940 A1 | 8/2002 | Bohnke et al. | |
| 2002/0118781 A1 | 8/2002 | Thomas et al. | |
| 2002/0119781 A1 | 8/2002 | Li et al. | |
| 2002/0126764 A1 | 9/2002 | Murakami et al. | |
| 2002/0136187 A1* | 9/2002 | Aoyama et al. | 370/342 |
| 2002/0147017 A1 | 10/2002 | Li et al. | |
| 2002/0159422 A1 | 10/2002 | Li et al. | |
| 2002/0163879 A1 | 11/2002 | Li et al. | |
| 2003/0002495 A1 | 1/2003 | Shahar et al. | |
| 2003/0018840 A1 | 1/2003 | Chandler et al. | |
| 2003/0053413 A1 | 3/2003 | Sawahashi et al. | |
| 2003/0053523 A1 | 3/2003 | Xu | |
| 2003/0060173 A1 | 3/2003 | Lee et al. | |
| 2003/0064728 A1 | 4/2003 | Speight | |
| 2003/0067891 A1 | 4/2003 | Jones et al. | |
| 2003/0069020 A1 | 4/2003 | Speight | |
| 2003/0069021 A1 | 4/2003 | Speight | |
| 2003/0072395 A1 | 4/2003 | Jia et al. | |
| 2003/0086366 A1 | 5/2003 | Branlund et al. | |
| 2003/0091132 A1 | 5/2003 | Anderson | |
| 2003/0095571 A1 | 5/2003 | Speight | |
| 2003/0095586 A1 | 5/2003 | Geers | |
| 2003/0096616 A1 | 5/2003 | Speight | |
| 2003/0099226 A1 | 5/2003 | Jones et al. | |
| 2003/0103445 A1 | 6/2003 | Steer et al. | |
| 2003/0103497 A1 | 6/2003 | Speight | |
| 2003/0112744 A1 | 6/2003 | Baum et al. | |
| 2003/0123559 A1 | 7/2003 | Classon et al. | |
| 2003/0152043 A1 | 8/2003 | Geers | |
| 2003/0169681 A1 | 9/2003 | Li et al. | |
| 2003/0223354 A1 | 12/2003 | Olszewski | |
| 2003/0227889 A1 | 12/2003 | Wu et al. | |
| 2003/0232601 A1 | 12/2003 | Uno | |
| 2004/0001429 A1 | 1/2004 | Ma et al. | |
| 2004/0009783 A1 | 1/2004 | Miyoshi | |
| 2004/0013131 A1 | 1/2004 | Owens et al. | |
| 2004/0015630 A1 | 1/2004 | Boolos et al. | |
| 2004/0059988 A1* | 3/2004 | Murakami et al. | 714/776 |
| 2005/0008104 A1* | 1/2005 | Katayama | 375/341 |
| 2005/0068931 A1* | 3/2005 | Cho et al. | 370/345 |
| 2005/0094738 A1* | 5/2005 | Park et al. | 375/260 |
| 2005/0152461 A1* | 7/2005 | Okazaki et al. | 375/259 |
| 2005/0169401 A1* | 8/2005 | Abraham et al. | 375/295 |

FOREIGN PATENT DOCUMENTS

| | | |
|---|---|---|
| WO | WO-01/30003 | 4/2001 |

OTHER PUBLICATIONS

Hamaguchi et al., Multicarrier/QAM-level-controlled Adaptive Modulation for Land Mobile Communication Systems, the 8th IEEE International Symposium on Helsinki, Finland, Sep. 1-4, 1997, New York, NY, pp. 1105-1109, vol. 3.

Falahati, Sorour, et al., "Adaptive Trellis-Coded Modulation over Predicted Flat Fading Channels", *Proceedings Vehicular Technology Conference*, Fall, Orlando, USA, (Oct. 6-9, 2003).

Hole, K. J., et al., "Adaptive Coding and Modulation: A Key to Bandwidth-Effcient Multimedia Communications in Future Wireless Systems", *Telektronikk (special issue on "Wireless Future")* vol. 97, No. 1(Telenor), (2001),49-57.

Sternad, Mikael, et al., "Attaining both Coverage and High Spectral Efficiency with Adaptive OFDM Downlinks ", *Proceedings Vehicular Technology Conference*, Fall, Orlando, USA, (Oct. 6-9, 2003).

Sternad, Mikael, et al., "Channel Estimation and Prediction for Adaptive OFDM Downlinks", *Proceedings Vehicular Technology Conference*, Fall, Orlando, USA, (Oct. 6-9, 2003).

Svensson, Arne, et al., "An OFDM downlink with adaptive modulation and scheduling for high mobility 4G systems", *Future Telecommunications Conference*; Beijing, China, (Dec. 2003).

Wang, Wei, et al., "Impact of Multiuser Diversity and Channel Variability on Adaptive OFDM", *Proceedings Vehicular Technology Conference*, Fall, Orlando, USA, (Oct. 6-9, 2003).

Xia, Pengfei, et al., "Adaptive MIMO-OFDM Based on Partial Channel State Information", *IEEE Transactions on Signal Processing*, vol. 52, No. 1, (Jan. 2004),202-213.

* cited by examiner

SYSTEM AND METHOD FOR ADAPTIVE MODULATION

BACKGROUND OF THE INVENTION

1. Field of the Invention

The present invention is directed generally to communication systems and, more particularly, to a system and method for adaptive modulation.

2. Description of the Related Art

A wireless data system should ideally select a form of modulation and coding to make the most efficient use of the radio channel. The quality of the radio link between a transmitter and receiver determines which combinations of modulation and coding can be used for data.

Fixed lines may perform an extended channel response measurement at the outset to determine the most effective modulation. For example, digital subscriber line (DSL) technology uses bit loading for orthogonal frequency division multiplexing (OFDM) over phone lines. The channel response is measured at startup, and modulation is varied tone-by-tone to maximize the overall throughput. Each terminal must know the modulation used for each tone. Upon completion of the line testing, the particular form of modulation and coding are selected to maximize data transfer rates. Although this approach may be thorough, it is time consuming and relies on the channel being largely static and unchanging over time. As such, it is not appropriate for the wireless environment.

Unlike wired systems, the radio channel is highly dynamic. Those skilled in the art will recognize that a number of factors, both predictable and unpredictable, combine to affect a particular wireless link. For example, radio frequency interference, relative motion between the transmitter and receiver, and other factors decrease the effectiveness of long-term channel estimates that are used in wired systems.

Prior art techniques describe the use of special training symbols for time synchronization and channel estimation. Such systems require that a special training symbol precede an air link burst containing one or more OFDM symbols. Because this prior art technique relies on one or more pilot OFDM symbols being transmitted, it is less efficient for short bursts and in environments with multi-user contention for the airlink.

Therefore, it can be appreciated that there is a significant need for system and method for adapting modulation techniques to changing airlink conditions. The present invention provides this and other advantages as will be apparent from the following detailed description and accompanying figures.

DETAILED DESCRIPTION OF THE INVENTION

As will be discussed in greater detail herein, a system and method disclosed herein can be configured to provide adaptive modulation that can quickly change as the dynamic conditions over the airlink change. In systems where a single terminal (e.g., a base station) is used to communicate with multiple terminals (e.g., subscribers), the modulation/coding combinations that could be used for data are determined by the quality of the radio link between the base station and each subscriber.

The adaptive modulation OFDM system utilizes embedded control information within each OFDM symbol to identify the modulation and coding used for data in that symbol. As such, the modulation/coding can be changed on a symbol-by-symbol basis. The embedded information has sufficient redundancy so that it can be readily decoded even when the embedded data itself cannot be recovered. The use of embedded signaling to identify the modulation and coding used within an OFDM symbol facilitates true packet-switched networking and highly efficient use of the radio link. This may be especially important in a contention-based airlink where multiple users are contending for availability of the airlink.

Figure 1:
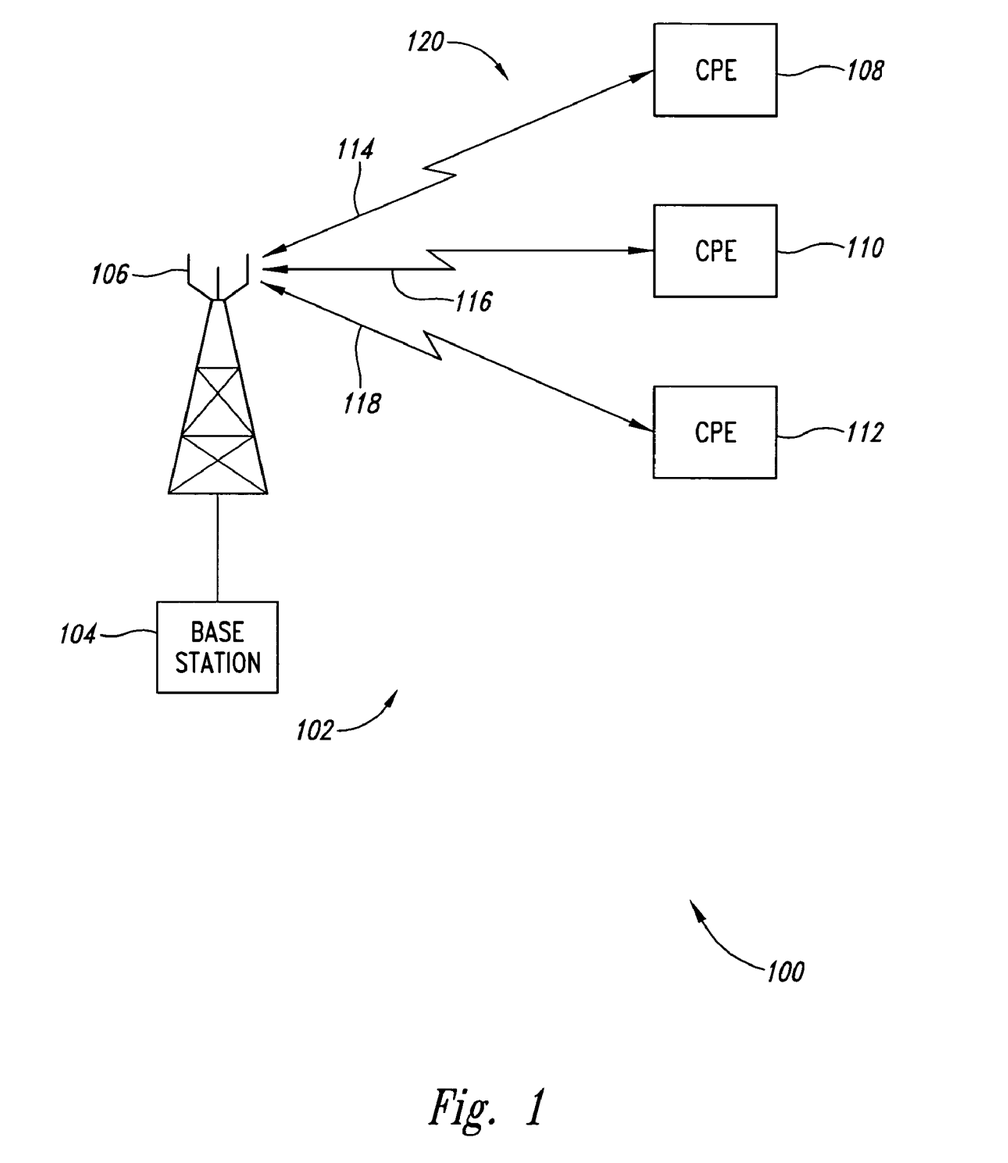
FIG. 1 is a functional block diagram of a wireless communication system.

The present invention is embodied in a system 100, which is illustrated in FIG. 1 as implemented in a wireless communication network 102. The wireless communication network 102 comprises a base station 104 coupled to an antenna system 106. The antenna system 106 is implemented in accordance with known principles and need not be discussed in greater detail herein. Although general operation of the base station is well understood, certain additional features used to implement the system 100 will be described in greater detail below.

The wireless communication network 102 also includes a plurality of customer premise equipment (CPE) 108-112, which communicate with the base station 104 via wireless communication links 114-118, respectively. The communication links 114-118 are illustrated in FIG. 1 as coupling the base station 104 to the individual CPEs 108-112, respectively. However, those skilled in the art will appreciate that the wireless communication links 114-118 may be considered a single contention-based communication link when the CPEs 108-112 are communicating with the base station on a single frequency channel, which is illustrated in FIG. 1 as a contention-based link 120. In a typical implementation, a single base station 104 may communicate with a 100 or more CPEs.

Transmissions from the base station 104 are referred to as the "downlink" while transmissions to the base station 104 are referred to as an "uplink." The CPEs 108-112 monitor the downlink to determine which modulation/coding combinations are supported by their radio link. Uplink bursts from each CPE can be modulated/encoded to make the most efficient use of the radio link. Upon initial power up, and during the course of operation, the CPE will register with the base station 104. The selection of a base station with which to communicate, as well as the registration process itself, are known to those skilled in the art and need not be described herein. As part of the registration process, the CPE may indicate which types of modulation/coding it has been able to detect. In addition, the CPE may indicate one or more preferred methods of modulation/coding. The system 100 may avoid subscriber polling and utilize short uplink bursts over the contention-based link 120 to improve efficiency of the contended link.

The system 100 allows a sending station to utilize the most effective modulation/coding technique available for the airlink. It should be noted that the term "sending station" is equally applicable to the base station 104 or any of the CPEs 108-112. That is, the base station 104 is considered a sending station when it is transmitting to one or more of the CPEs. Conversely, the CPE 110 is considered a sending station when it is transmitting data to the base station 104.

The receiving station can detect pilot signals embedded within the OFDM symbol and thereby determine precisely which modulation/coding combination was used to transmit that particular symbol. The term "receiving station" is equally applicable to the base station 104 and the CPEs 108-112. That is, the base station 104 is a receiving station when it receives data transmitted from one of the CPEs. Conversely, one or more of the CPEs are considered receiving stations when they receive data transmitted from the base station 104. Thus, for purposes of the present invention, the base station 104 and the CPEs 108-112 are essentially equivalent to each other.

Figure 2:
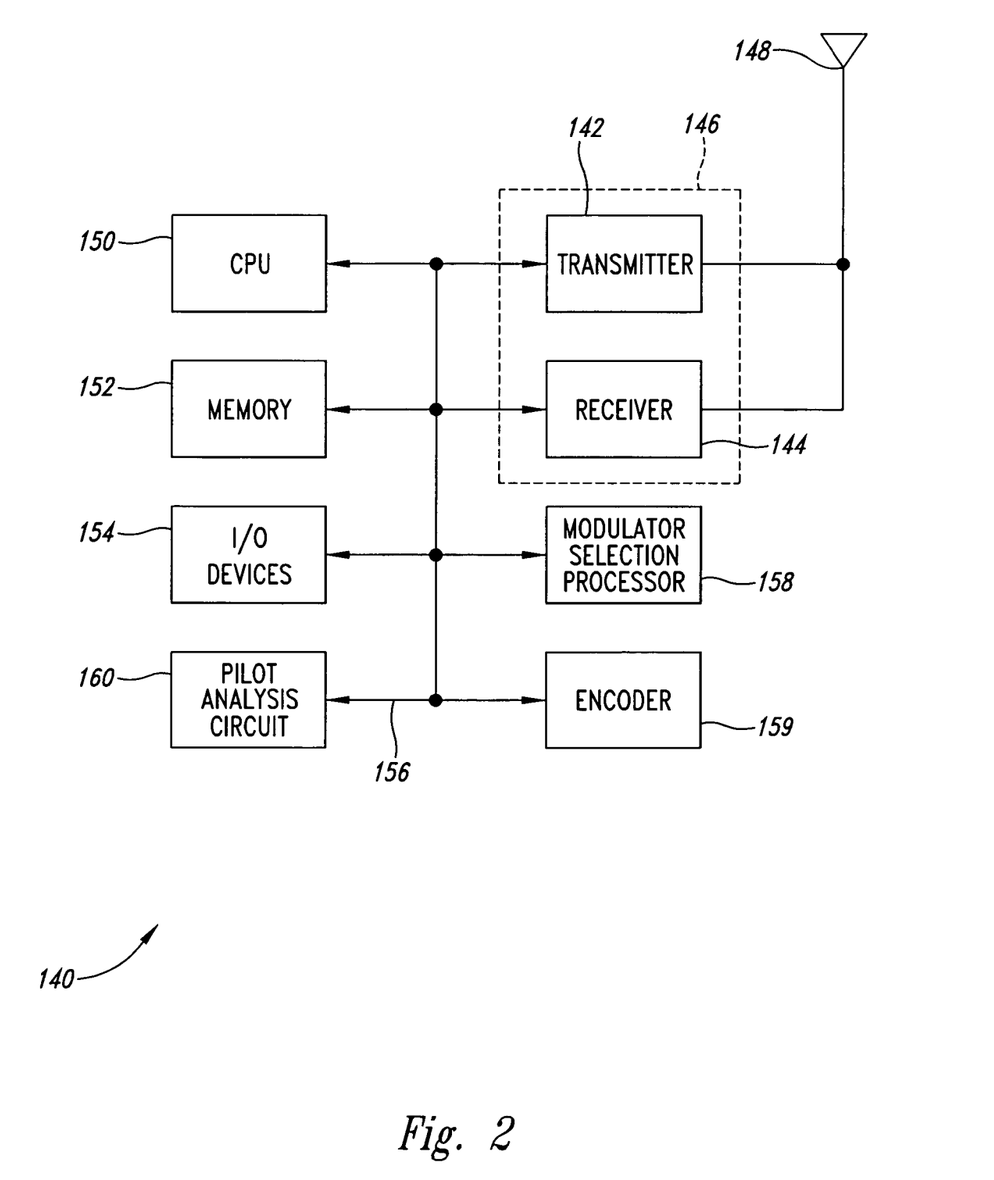
FIG. 2 is a functional block diagram of a wireless station of the wireless system of FIG. 1.

FIG. 2 is a functional block diagram of a wireless station 140. As noted above, the wireless station 140 may be implemented as the base station 104 or any of the CPEs 108-112. The wireless station 140 comprises a transmitter 142 and a receiver 144. Those skilled in the art will recognize that portions of the transmitter 142 and receiver 144 may be combined to form a transceiver 146. Operation of these components is known in the art and need not be described in greater detail herein.

The transmitter and receiver are coupled to an antenna 148. The antenna 148 may typically be externally mounted, such as the antenna 106, if the wireless station 140 is implemented as the base station 104 in FIG. 1. However, if the wireless station 140 is a CPE (e.g., the CPE 108 of FIG. 1), the antenna 148 may be implemented externally or as an internal antenna.

An example of wireless operation utilizing an OFDM non-line-of-sight CPE with internal premises antenna is provided in U.S. application Ser. No. 09/694,766, filed Oct. 23, 2000, and entitled FIXED OFDM WIRELESS MAN UTILIZING CPE HAVING INTERNAL ANTENNA. That application, which is assigned to the assignee of the present invention, is incorporated herein by reference in its entirety.

In a typical embodiment, the wireless station 140 also includes a central processing unit (CPU) 150 and memory 152. The CPU 150 may be satisfactorily implemented by a conventional microprocessor, microcontroller, digital signal processor, programmable gate array, or the like. The present invention is not limited by the specific implementation of the CPU 150. Similarly, the memory 152 may include one or more conventional data storage components, such as random access memory, read-only memory, flash memory, or the like, and may include a combination of these elements. In general, the CPU executes instructions stored in the memory 152.

The wireless station 140 may also include a number of different I/O devices 154, such as a keyboard, display cursor control device, mass storage device(s), and the like. For the sake of brevity, these various components, whose operation is well understood, are referred to as the I/O devices 154. The various components of the wireless station 140 are coupled together by a bus system 156. The bus system 156 may comprise an address bus, data bus, control bus, power bus, and the like. For the sake of convenience, the various busses are illustrated in FIG. 2 as the bus system 156.

The wireless station 140 also includes a modulator selection processor 158 and an encoder 159. The modulator selection processor 158 determines which of many different available types of modulation will be used by the transmitter 142. The encoder 159 may optionally be used to provide encoding for the modulated signal.

In addition to the components described above, the wireless station 140 includes pilot analysis circuit 160, which will be described in greater detail below. The pilot analysis circuit 160 analyzes a received symbol, identifies the pilot signals embedded therein, and determines which type of modulation/coding was used with that particular symbol.

Those skilled in the art will appreciate that OFDM symbols may be successfully transmitted using a variety of different modulation techniques. Such techniques include, but are not limited to, binary phase shift keying (BPSK), and quadrature amplitude modulation (QAM) schemes commonly referred to as 4QAM (sometimes called QPSK for quadrature phase shift keying), 16QAM, and 64QAM. The various forms of modulation described above are each capable of delivering a greater or lessor number of data bytes per OFDM symbol. For example, BPSK provides one data bit per OFDM tone. In contrast, 4QAM provides two data bits per tone, or twice the payload of BPSK. With a change to 16QAM the payload is doubled over the 4QAM data rate (4 data bits per tone). Lastly, 64QAM modulation provides six data bits per tone, resulting in a payload of three times greater than the 4QAM modulation payload.

Those skilled in the art will recognize that dynamic conditions of the airlink may not permit a high data rate, such as 64QAM. In addition, other hardware limitations may prevent the use of certain modulations. For example, the CPE 108 (see FIG. 1) may include a lower cost transmitter 142 (see FIG. 2) that does not support 64QAM modulation. In this example, the CPE 108 would not be able to utilize 64QAM modulation when communicating with the base station 104 even if the base station 104 is inherently capable of such modulation.

The modulator selection processor 158 determines which modulation processes are available and which modulation process may be most effective given the current condition of the airlink. Those skilled in the art will recognize that the modulation selection processor 158 may be implemented as a set of instructions stored in the memory 152 and executed by the CPU 150. However, the modulator selection processor 158 is illustrated as a separate block in FIG. 3 because it performs a distinct function.

The encoder 159 encodes the modulated signal if conditions warrant. Encoding, such as block encoding or convolutional encoding, is used to provide error correction capabilities when the condition of the airlink is less than ideal. Although the encoder 159 provides robust error detection and correction, it also decreases data throughput. Those skilled in the art will appreciate that the encoding process increases the number of transmitted data bits for each OFDM data bit provided as an input to the encoder. If it is possible to get low error rates on the airlink without such encoding, the encoder 159 may be bypassed to increase the data transfer rate.

When a particular modulation and optional coding are selected, the pilot signals are assigned in a deterministic fashion based on a particular combination of modulation/coding and distributed throughout the OFDM symbol provide an indication of the selected combination of modulation and coding. In an exemplary embodiment, a pseudorandom number (PN) sequence is used to determine the phase of each pilot signal. The phase scrambling can be accomplished using a different PN sequence or different phases of the same PN sequence for each combination of modulation/coding used for data.

The OFDM sample is transmitted to one or more receivers. When the wireless unit 140 (see FIG. 2) receives an OFDM symbol, the pilot analysis circuit 160 detects and analyses the pilot tones to determine the combination of modulation/coding used for that particular symbol.

To better understand the use of the pilot signals and the operation of the pilot analysis circuit 160 to determine the modulation/coding, consider an example in which every sixth sample in an OFDM symbol is a pilot signal. Further assume that there are 136 pilot signals in an OFDM symbol and that each symbol is modulated by a pseudo random noise (PN) sequence corresponding to the combination of modulation/coding used for that OFDM symbol.

The receiver 144 receives an OFDM symbol, but has a certain inherent frequency inaccuracy that requires searching to detect the pilot signals embedded within the OFDM symbol. The oscillator (not shown) within the receiver 144 has sufficient accuracy that the search range can be limited to ±4 OFDM tones (frequency bins). Thus, the received OFDM symbol is considered to have a bounded frequency bin shift within the range of −4, −3, −2, −1, 0, 1, 2, 3, 4. The task of the pilot analysis circuit 160 is to descramble the received symbol and calculate the correlation of its 136 pilot signals for each of the 9 possible input shifts (i.e., ±4 bins).

The PN sequence causes transmitted data and pilots to be multiplied by (1+j0) or (−1+j0).

Although equation 1 is fairly complex, expansion of the first two terms of the pilot correlation, shown in Table 1 below, shows that data samples are input serially with the pilot signals spaced every six samples. This requires only three different PN numbers to be stored in the pilot analysis circuit 160 at any given time thus greatly reducing the amount of circuitry required.

TABLE 1

| Time | Input | First lag term, 1 | 1st term in summation (n = 0) | Second lag term, 1 | 2nd term in summation (n = 1) |
|---|---|---|---|---|---|
| −4 | x(−4) | | | | |
| −3 | x(−3) | | | | |
| −2 | x(−2) | | | | |
| −1 | x(−1) | | | | |
| 0 | x(0) | | | | |
| 1 | x(1) | | | | |
| 2 | x(2) | −4 | x * (−4)x(2)PN(6)PN(0) | | |
| 3 | x(3) | −3 | x * (−3)x(3)PN(6)PN(0) | | |
| 4 | x(4) | −2 | x * (−2)x(4)PN(6)PN(0) | | |
| 5 | x(5) | −1 | x * (−1)x(5)PN(6)PN(0) | | |
| 6 | x(6) | 0 | x * (0)x(6)PN(6)PN(0) | | |
| 7 | x(7) | 1 | x * (1)x(7)PN(6)PN(0) | | |
| 8 | x(8) | 2 | x * (2)x(8)PN(6)PN(0) | −4 | x * (2)x(8)PN(12)PN(6) |
| 9 | x(9) | 3 | x * (3)x(9)PN(6)PN(0) | −3 | x * (3)x(9)PN(12)PN(6) |
| 10 | x(10) | 4 | x * (4)x(10)PN(6)PN(0) | −2 | x * (4)x(10)PN(12)PN(6) |
| 11 | x(11) | | | −1 | x * (5)x(11)PN(12)PN(6) |
| 12 | x(12) | | | 0 | x * (6)x(12)PN(12)PN(6) |
| 13 | x(13) | | | 1 | x * (7)x(13)PN(12)PN(6) |
| 14 | x(14) | | | 2 | x * (8)x(14)PN(12)PN(6) |
| 15 | x(15) | | | 3 | x * (9)x(15)PN(12)PN(6) |
| 16 | x(16) | | | 4 | x * (10)x(16)PN(12)PN(6) |

Note:
To simplify indexing, the guard band offset (106 samples) has been ignored.

The pilot analysis circuit 160 must calculate a pilot correlation for each of the nine possible input shifts for a single PN scrambling sequence. By changing the PN sequence, the function can be performed for any of the modulation/coding combinations.

The correlation analysis requires the pilot analysis circuit 160 to compute a set of complex correlations. The correlations for lagged values that align the pilot signals will have a large value while other signals will have small values. In this manner, the pilot analysis circuit 160 detects the pilot signals. It should be noted that the term "lag," as used herein, is equivalent to an integral frequency bin shift. The correlation function executed by the pilot analysis circuit 160 is given by equation (1) as follows:

$$r_{xx^*}(l) = \sum_{n=0}^{135} x^*(6n + 106 + l)PN^*(6n)x(6n + 106 + 6 + l)PN(6n+6) \quad (1)$$

where x is the received symbol (note that there is a 106 sample offset in the nominal case due to a guard band, which is ignored for the sake of simplicity in understanding the system 100), n is the pilot index l is the lag (the frequency bin offset), l ∈ {−4, −3, −2, −1, 0, 1, 2, 3, 4}, PN is the pseudorandom noise sequence scrambling the symbol in the modulator.

As is made clear by the above graphical representation, the data samples are input serially with the pilots spaced every 6 samples. Only three different PN numbers must be stored in the pilot analysis circuit 160 block at any time, greatly reducing the size of the block. In the example of Table 1, only PN(0), PN(6), and PN(12) are required for analysis of the first and second terms in the summation.

Further simplification is possible by noting that conjugate operation does not change the value of the PN terms since they are real numbers. The product of PN(6n+6) and PN(6n) simplifies to a factor of ±1 and allows equation 1 to be reduced as follows:

$$r_{xx^*}(l) = \sum_{n=0}^{135} x^*(6n + 106 + l)x(6n + 106 + 6 + l) * (\pm 1) \quad (2)$$

It should be noted that equations 1 and 2 illustrate correlation analysis where every sixth tone is a pilot signal. However, the inventive concept embodied herein are not limited by such a pilot signal arrangement. Other arrangements of embedded pilot tones may also be used satisfactorily. For example, if every seventh tone is a pilot signal, equations 1 and 2 would be altered in a fashion clearly understood by those skilled in the art to evaluate correlation between every seventh signal. Furthermore, equations 1 and 2 merely provide an example correlation analysis. However, the present invention is not limited by the specific form of analysis used to detect the pilot signals.

Figure 3:
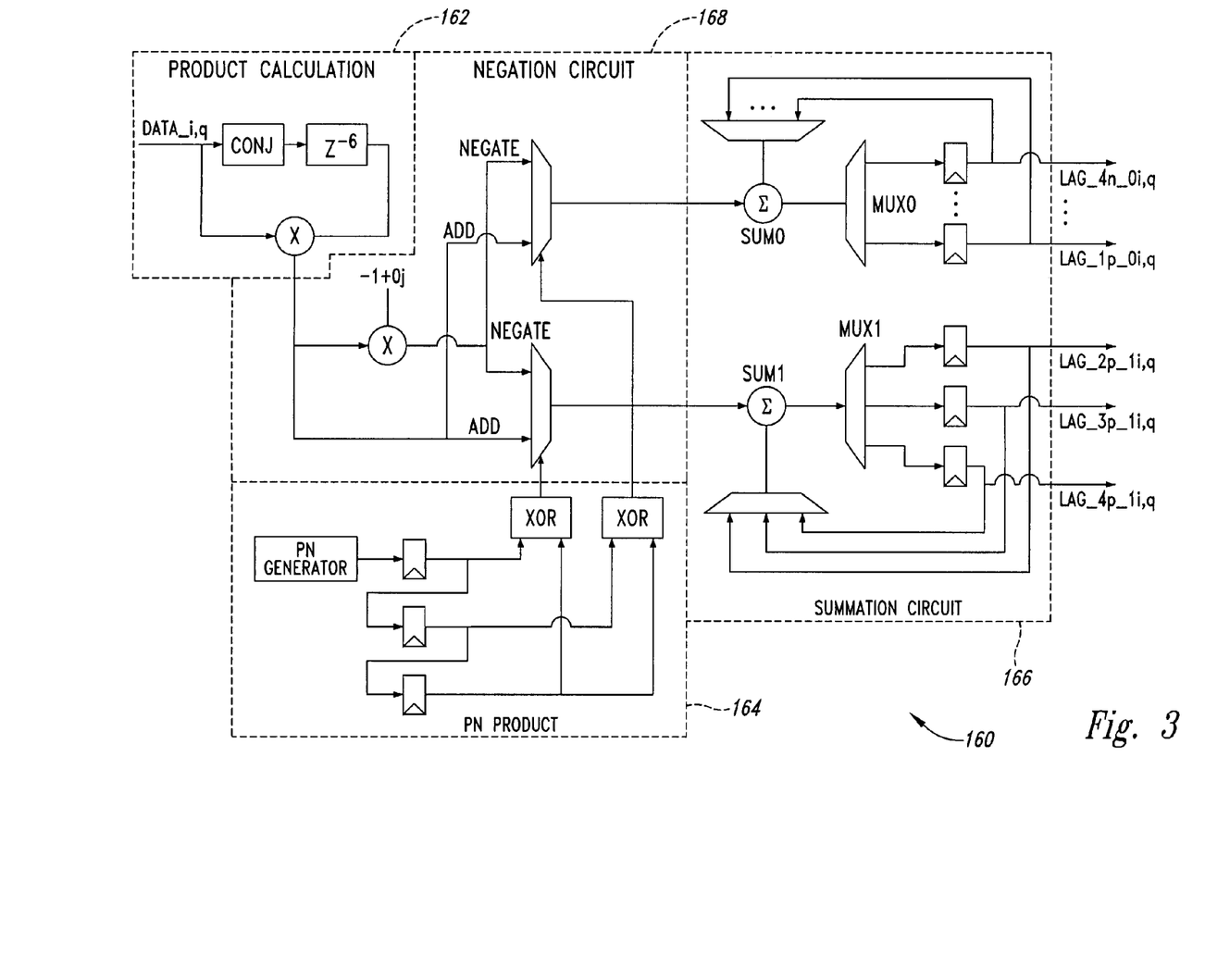
FIG. 3 is schematic diagram of a pilot analysis circuit for the wireless station of FIG. 2.

FIG. 3 is a schematic of an exemplary embodiment of the pilot analysis circuit 160. In FIG. 3, a product calculation circuit 162 receives the serial data and calculates the product x*(6n+106+/)×(6n+106+6+/). It should be noted that the six sample delay in the product calculation circuit 162 is based on the engineering decision to place pilot signals at every six samples. Those skilled in the art will appreciate that modifications to the system 100 (e.g., pilots spaced at every seven samples) will require modification to the circuit of FIG. 3. The product calculated by the product calculation circuit 162 is either added to the sum or subtracted from the running sum.

A PN product circuit 164 in FIG. 3 generates the PN products and control multiplexors to determine whether the product calculation from the product calculation circuit 162 is added or subtracted from the running sum. The PN product circuit 164 of FIG. 1 calculates the products PN(n)PN(n+6) and PN(n+6)PN(n+12).

A summation circuit 166 adds or subtracts the present product calculation value from the product calculation circuit 162 to the running total. A negation circuit 168 produces both a positive and a negative value for the product calculation determined by the product calculation circuit 162. The selection of a positive or negative value is controlled by the PN product circuit 164. This value (either a positive or negative value) is added to the running total by the summation circuit 166. The summation circuit 166 generates individual outputs for each of the 9 possible lag times. Referring back to Table 1, at time t=2, the first summation product of $r_{xx}\cdot(-4)$ is calculated using an adder Sum0 and multiplexor Mux0 and stored in the register labeled lag_4n_0i,q. At time t=5, the first summation product of $r_{xx}\cdot(-3)$ is calculated and stored in the registered labeled lag_3n_0i,q (not shown). This process continues until time t=8, when two products are calculated. The term x*(2)x(8)PN(6)PN(0) is calculated in the lower branch of the summation circuit 166 using an adder Sum1 and multiplexor Mux1 and added to the contents of the register labeled lag_2p_1i,q. The second product x*(2)x(8)PN(12) PN(6) is calculated in the upper branch of the summation circuit 166 using an adder Sum0 and multiplexor Mux0 and added to the contents of the register labeled lag_4n_0i,q. This process continues until all received data has flowed through the circuit. At the end of this process, the register labeled lag_4n_0i,q contains the contents of $r_{xx}\cdot(-4)$, the registered labeled lag_3n_0i,q contains the value for $r_{xx}\cdot(-3)$ and so on through the register labeled lag_4p_1i,q, which contains the value for $r_{xx}\cdot(4)$.

Upon completion of this process, the output of one of the nine registers in the summation circuit 166 will contain a value larger than other registers, indicating which of the lag times is correct for that particular PN sequence. Altering the PN sequence in the PN product circuit 164 allows the pilot analysis circuit 160 to perform the same calculation process for the PN sequence corresponding to each of the possible combinations of modulations/coding. In an exemplary embodiment, the circuitry of FIG. 3 is reproduced for each possible combination of modulation/coding. For example, several possible optional modulation schemes (BPSK, 4QAM, 16QAM, and 64QAM) were described as well as three example coding schemes (none, block, convolution). With these examples, there are four modulation possibilities and three coding possibilities for a total of 12 different combinations. In this example, the circuitry of FIG. 3 would be reproduced 12 times. It should be noted that it is not necessary to reproduce the product calculation circuit 162 multiple times since it is identical for all calculations.

Using the above listed modulation/coding examples, each of the 12 "copies" of the pilot analysis circuit 160 in FIG. 3 produces nine outputs corresponding to the bounded lag times (i.e., ±4 frequency bin offsets). Thus, a total of 108 outputs are generated. One of the 108 outputs will have a larger magnitude than the remaining outputs. Finding the correlation sum with the largest magnitude identifies the PN sequence used by the transmitter and the frequency offset at the receiver. The PN sequence is, by design, unique to each combination of modulation/coding used by the transmitter. Thus, identification of the proper PN sequence uniquely identifies the modulation/coding used for that particular OFDM symbol. This arrangement of unique pilot and coding allows modulation/coding to change on a symbol-by-symbol basis and enables efficient use of the radio channel.

Thus, the pilot analysis circuit 160 efficiently analyzes a received OFDM symbol and determines the specific modulation/coding for that particular OFDM symbol. Although the system 100 has been described using a PN sequence to uniquely identify the modulation/coding, those skilled in the art will appreciate that any deterministic scrambling system may be used to uniquely encode the modulation/coding combinations.

The system 100 also permits simple measurement of the channel response. For a transmitted data value, the received data is altered by the channel response in the frequency domain. The channel response may be determined simply by noting the amplitude and phase at the detected pilot bins. Because the amplitude and phase at the transmitter are known (i.e., magnitude 1 at 0° or 180°), the channel response measurement is directly measured at the bins containing pilots.

The system 100 also allows an estimation of time synchronization error by determining an average phase shift from pilot signal to pilot signal. The average phase shift is used in a known manner to estimate the time synchronization error.

Returning again to FIG. 1, the single base station 104 can communicate with the individual CPEs 108-112 using different modulation/coding combinations for each depending on the particular conditions of the communication links 114-118 between the base station and the respective CPEs. This advantageously allows much greater efficiency of the contention-based link 120.

The foregoing described embodiments depict different components contained within, or connected with, different other components. It is to be understood that such depicted architectures are merely exemplary, and that in fact many other architectures can be implemented which achieve the same functionality. For example, the system 100 has been illustrated in the example embodiment of the wireless communication network 102. However, those skilled in the art will appreciate that the adaptive modulation techniques are equally applicable to a wired system. As noted above, DSL systems implement OFDM systems using a phone line. The adaptive modulation techniques described herein are applicable to such wired systems. Furthermore, the adaptive modulation examples using OFDM are applicable to other modulation techniques. Accordingly, the invention is not limited to adaptive modulation using only OFDM.

In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

The invention claimed is:

1. An orthogonal frequency division multiplexing (OFDM) modulation method comprising:
   generating, by a wireless station, a symbol using a selected one of a plurality of modulation techniques;
   embedding, by the wireless station, a plurality of pilot signals distributed throughout the symbol at predetermined intervals; and
   encoding, by the wireless station, the pilot signals such that a combination of pilot signals uniquely identifies the selected one of the plurality of modulation techniques.

2. The method of claim 1 wherein a pilot signal is embedded at every sixth interval throughout the symbol.

3. The method of claim 1 wherein each of the embedded pilot signals has an associated phase assigned in a deterministic manner wherein the associated phases of the pilot signals uniquely identify the selected one of the plurality of modulation techniques.

4. The method of claim 1 wherein each of the embedded pilot signals has an associated phase assigned using a pseudorandom number (PN) sequence wherein the associated phases of the pilot signals uniquely identify the selected one of the plurality of modulation techniques.

5. The method of claim 4 wherein the associated phases assigned to the embedded pilot signals has a phase of 0° or 180° based on the PN sequence.

6. The method of claim 1 wherein generating the symbol further comprises coding the symbol using a selected one of a plurality of coding techniques and the combination of pilot signals uniquely identifies the selected one of the plurality of modulation techniques and the selected one of the plurality of coding techniques.

7. The method of claim 1 wherein the modulated symbol is transmitted, the method further comprising:
   receiving the symbol;
   detecting at least a portion of the pilot signals embedded within the symbol; and
   determining the selected one of the plurality of modulation techniques used based on the detected pilot signals.

8. The method of claim 7 wherein the location of the detected pilot signals embedded within the symbol provide a coarse frequency synchronization.

9. The method of claim 7, further comprising determining an average phase shift from pilot signal to pilot signal and using the average phase shift to estimate a time synchronization error.

10. The method of claim 7, further comprising using an amplitude and phase of a selected pilot signal to determine a channel response at the location of the selected pilot signal.

11. A method for identifying a modulation type for a received symbol, the method comprising:
    analyzing, by a wireless station, the symbol to identify a plurality of pilot signals embedded within the symbol;
    analyzing the pilot signals; and
    on the basis of the pilot signal analysis, uniquely identifying, by the wireless station, the modulation type for the received symbol.

12. The method of claim 11 wherein each of the embedded pilot signals has an associated phase assigned in a deterministic manner wherein analyzing the pilot signals comprises analyzing the associated phases of the pilot signals to uniquely identify the modulation type.

13. The method of claim 11 wherein each of the embedded pilot signals has an associated phase assigned using a pseudorandom number (PN) sequence wherein analyzing the pilot signals comprises analyzing the associated phases of the pilot signals to uniquely identify the modulation type.

14. The method of claim 13 wherein the associated phases assigned to the embedded pilot signals has a phase of 0° or 180° based on the PN sequence.

15. The method of claim 11 wherein a pilot signal is embedded at every sixth interval throughout the symbol.

16. The method of claim 11 wherein analyzing the symbol comprises performing a correlation analysis of the received symbol.

17. The method of claim 16 wherein the correlation analysis of the received symbol comprises a correlation analysis using patterns corresponding to the modulation types.

18. The method of claim 11 wherein the symbol is encoded using a selected one of a plurality of coding techniques and analyzing the pilot signals uniquely identifies the selected one of the plurality of modulation techniques and the selected one of the plurality of coding techniques.

19. A modulation system comprising:
    a modulation selection processor to select a modulation type selected from a plurality of modulation types; and
    a modulator to modulate data and thereby generate a symbol for transmission, the modulator configured to embed a plurality of pilot signals throughout the symbol at predetermined intervals, wherein the pilot signals are encoded such that a combination of pilot signals uniquely identifies the selected one of the plurality of modulation techniques.

20. The system of claim 19 wherein a pilot signal is embedded at periodic intervals throughout the symbol.

21. The system of claim 19 wherein the modulator is further configured to assign a phase to each of the embedded pilot signals in a deterministic manner wherein the assigned phases of the pilot signals uniquely identify the selected one of the plurality of modulation techniques.

22. The system of claim 19 wherein the modulator is further configured to assign a phase to each of the embedded pilot signals using a pseudorandom number (PN) sequence wherein the assigned phases of the pilot signals uniquely identify the selected one of the plurality of modulation types.

23. The system of claim 22 wherein the modulator is configured to assign a phase of 0° or 180° to the embedded pilot signals based on the PN sequence.

24. The system of claim 19, further comprising an encoder to encode the modulated symbol using a selected one of a plurality of coding types and the combination of pilot signals uniquely identifies the selected one of the plurality of modulation types and the selected one of the plurality of coding types.

25. The system of claim 19 wherein the modulated symbol is transmitted, the system further comprising:
a receiver to receive the symbol and to detect at least a portion of the pilot signals embedded within the symbol, the receiver configured to determine the selected one of the plurality of modulation types used based on the detected pilot signals.

26. The system of claim 25 wherein the receiver is configured to derive a coarse frequency synchronization based on a location of the detected pilot signals embedded within the symbol.

27. The system of claim 25 wherein the receiver is configured to derive an average phase shift from pilot signal to pilot signal and to estimate a time synchronization error based on the average phase shift.

28. The system of claim 25 wherein the receiver is further configured to determine a channel response at the location of a selected pilot signal using an amplitude and phase of the selected pilot signal.

29. A method for generating a modulated symbol wherein the symbol is modulated using a selected one of a plurality of modulation types, the method comprising:
generating, by a wireless station, a plurality of tones indicative of data; and
distributing, by the wireless station, a plurality of pilot signals throughout the symbol at predetermined intervals, wherein the pilot signals are encoded such that a combination of pilot signals uniquely identifies the selected one of the plurality of modulation types.

30. The method of claim 29 wherein the method further comprises assigning, by the wireless station, a phase to each of the pilot signals in a deterministic manner, the associated phases of the pilot signals uniquely identifying the modulation type.

31. The method of claim 29 wherein the method further comprises assigning, by the wireless station, a phase to each of the pilot signals using a pseudorandom number (PN) sequence, the associated phases of the pilot signals uniquely identifying the modulation type.

32. The method of claim 29 wherein the method further comprises encoding, by the wireless station, the symbol using a selected one of a plurality of coding techniques and wherein the pilot signals uniquely identify the selected one of the plurality of modulation types and the selected one of the plurality of coding types.

33. An apparatus for identifying a modulation type, comprising:
a receiver to receive a symbol; and
a pilot analysis circuit configured to analyze the symbol to identify a plurality of pilot signals embedded therein, to analyze the pilot signals, and to uniquely identify the modulation type for the received symbol on the basis of the pilot signal analysis.

34. The apparatus of claim 33 wherein each of the embedded pilot signals has an associated phase assigned in a deterministic manner wherein the pilot analysis circuit is further configured to analyze the associated phases of the pilot signals to uniquely identify the modulation type.

35. The apparatus of claim 33 wherein each of the embedded pilot signals has an associated phase assigned using a pseudorandom number (PN) sequence wherein the pilot analysis circuit is further configured to analyze the associated phases of the pilot signals assigned using the pseudorandom number (PN) sequence to uniquely identify the modulation type.

36. The apparatus of claim 33 wherein a the pilot signals are embedded at periodic intervals throughout the symbol and the pilot analysis circuit is further configured to identify a plurality of pilot signals embedded therein.

37. The apparatus of claim 33 wherein the pilot analysis circuit is further configured to perform a correlation analysis of the received symbol.

38. The apparatus of claim 37 wherein the pilot analysis circuit performs the correlation analysis using patterns corresponding to the modulation types.

39. The apparatus of claim 33 wherein the symbol is encoded using a selected one of a plurality of coding types and the pilot analysis circuit is further configured to analyze the pilot signals to uniquely identify the selected one of the plurality of modulation types and the selected one of the plurality of coding types.

* * * * *